United States Patent
Nitta

(10) Patent No.: US 8,108,814 B2
(45) Date of Patent: Jan. 31, 2012

(54) DUMMY METAL INSERTION PROCESSING METHOD AND APPARATUS

(75) Inventor: Izumi Nitta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 12/337,350

(22) Filed: Dec. 17, 2008

(65) Prior Publication Data

US 2009/0276745 A1 Nov. 5, 2009

(30) Foreign Application Priority Data

Apr. 30, 2008 (JP) ................. 2008-119080

(51) Int. Cl.
*G06F 9/455* (2006.01)
*G06F 17/50* (2006.01)

(52) U.S. Cl. .......... 716/108; 716/105; 716/134; 716/51; 716/113

(58) Field of Classification Search .................. 716/105, 716/108, 134, 51, 113

See application file for complete search history.

(56) References Cited

U.S. PATENT DOCUMENTS 7,383,521 B2 * 6/2008 Smith et al. .............. 716/114

FOREIGN PATENT DOCUMENTS

| JP | A 5-258017 | 10/1993 |
|----|------------|---------|
| JP | A 2002-366599 | 12/2002 |
| JP | A 2003-282569 | 10/2003 |
| JP | A 2004-86318 | 3/2004 |

* cited by examiner

*Primary Examiner* — Vuthe Siek
*Assistant Examiner* — Brian Ngo
(74) *Attorney, Agent, or Firm* — Fujitsu Patent Center

(57) ABSTRACT

A method includes: before carrying out a timing verification processing of a semiconductor circuit, preliminarily superposing and arranging a dummy pattern template representing an arrangement pattern of dummy metal, onto a layout area defined by layout data while changing an origin position of the dummy pattern template to optimize the origin position of the dummy pattern template; and upon detecting that the result of the timing verification processing has no problem, superposing and arranging the dummy pattern template onto the layout area at the origin position of the dummy pattern template, to generate the layout data after inserting the dummy metal.

10 Claims, 20 Drawing Sheets

| A1 | A4 | A7 |
|----|----|----|
| A2 | A5 | A8 |
| A3 | A6 | A9 |
FIG.9
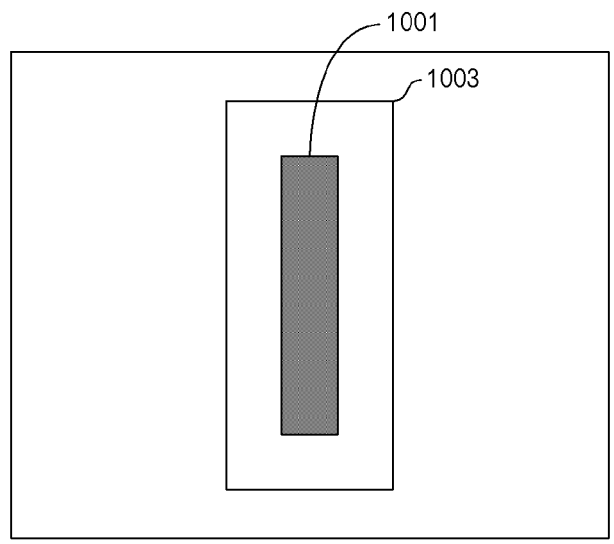
FIG.10
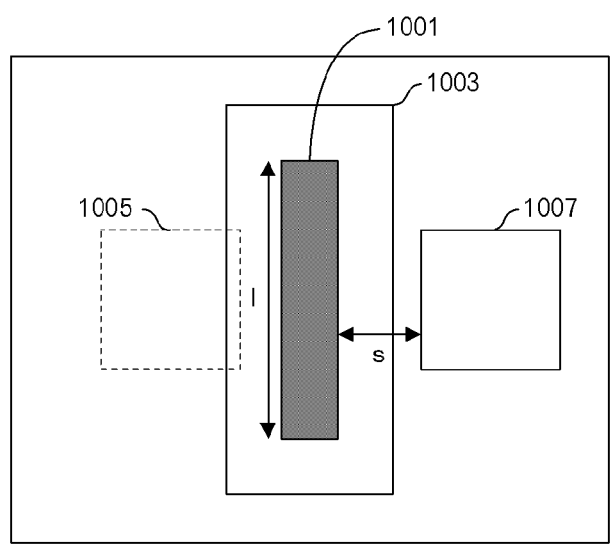
FIG.11

| LAYER NO. | α | β | γ | δ |
|---|---|---|---|---|
| 1 | -0.50 | 4.2 | -0.05 | 0.9 |
| 2 | -0.35 | 1.0 | -0.04 | 0.9 |
| : | : | : | : | : |
| N | -0.25 | 1.0 | -0.01 | 1.1 |

RELATION BETWEEN s AND $\Delta c$ IN LAYER NO. m

| s | $\Delta c$ |
|---|---|
| 0.3 | 2.00 |
| 0.4 | 1.75 |
| : | : |
| 1.4 | 0.22 |
| 1.5 | 0.20 |

RELATION BETWEEN d AND $\Delta r$ IN LAYER NO. m

| d | $\Delta r$ |
|---|---|
| 0.1 | 0.9 |
| 0.2 | 0.5 |
| : | : |
| 0.8 | 0.22 |
| 0.9 | 0.22 |

| WIRING SEGMENT NO. | $\Delta c$ | $\Delta r$ |
|---|---|---|
| 1 | 0.005 | 120.0 |
| 2 | 0 | 0 |
| ⋮ | ⋮ | ⋮ |
| K | 1.205 | 10.0 |

$p_{opt} = (100, 400)$, $Cmin = 100$

| LAYER NO. | α | β | γ |
|---|---|---|---|
| 1 | -0.50 | -0.05 | 1.25 |
| 2 | -0.35 | -0.04 | 1.05 |
| : | : | : | : |
| N | -0.25 | -0.01 | 1.00 |

FIG.24

RELATION BETWEEN s1 AND s2 AND ⊿c IN LAYER NO. m

| s2 \ s1 | 0.3 | 0.4 | : | 1.5 |
|---|---|---|---|---|
| 0.3 | 3.50 | 3.20 | : | 2.00 |
| 0.4 | 2.80 | 3.10 | : | 1.75 |
| : | : | : | : | : |
| 1.4 | 1.80 | 1.65 | : | 0.12 |
| 1.5 | 1.70 | 1.65 | : | 0.10 |

FIG.25

| TEMPLATE NO. | ORIGIN POSITION (X,Y) | Cmin |
|---|---|---|
| $T_3$ | (5000,2500) | 30 |

| LAYER NO. | TEMPLATE NO. | ORIGIN POSITION(X,Y) | Cmin |
|---|---|---|---|
| 1 | $T_3$ | (5000,2500) | a |
| 2 | $T_1$ | (0,0) | b |
| : | : | : | c |
| N | $T_2$ | (0,1000) | d |

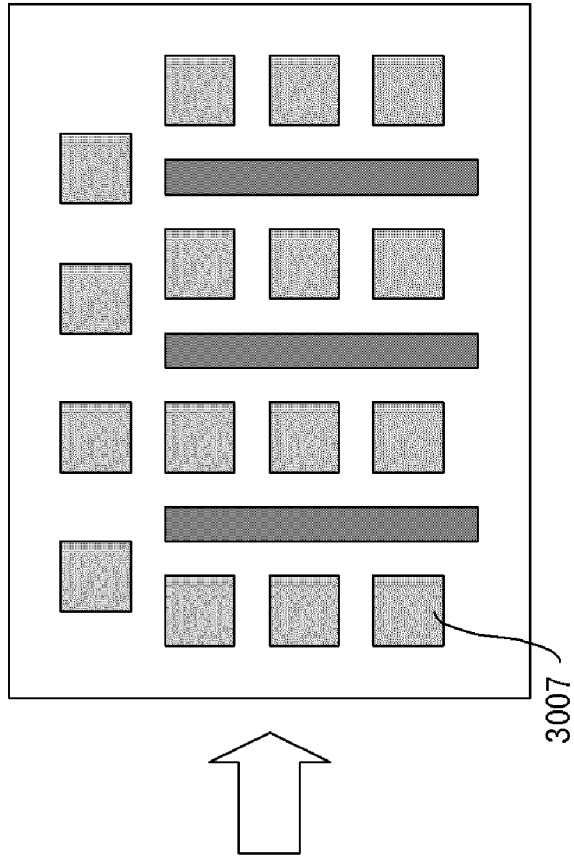
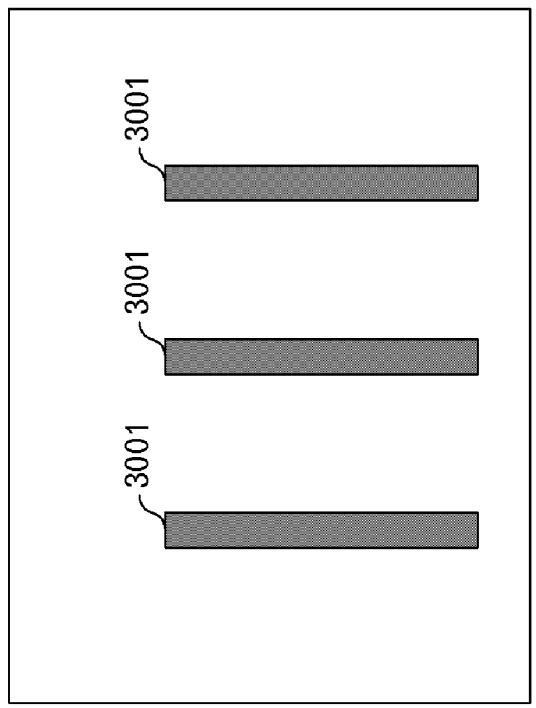
FIG.34B PRIOR ART
FIG.34A PRIOR ART

DUMMY METAL INSERTION PROCESSING METHOD AND APPARATUS

CROSS-REFERENCE TO RELATED APPLICATIONS

This application is based upon and claims the benefit of priority of the prior Japanese Patent Application No. 2008-119080, filed on Apr. 30, 2008, the entire contents of which are incorporated herein by reference.

FIELD

The embodiments discussed herein relate to a technique for inserting dummy metal in the Large Scale Integrated circuit (LSI) design.

BACKGROUND

In the LSI manufacturing process, it is important to equalize the metal density (i.e. a ratio of metal for the chip area) as one requirement to suppress the manufacturing dispersion. For example, when the metal density is not equalized, the heights of the wirings vary after the Chemical Mechanical Planarization (CMP) process, as depicted in FIG. 33. In the example of FIG. 33, several wirings 3001 are formed in an insulator 3003. However, compared with a dotted line 3005 as a reference, it is understood that the wirings on the left side are rarely cut, but the wirings on the right side are deeply cut. Thus, it is not preferable that the heights of the wirings vary.

In order to equalize the metal density, the insertion of the dummy metal has conventionally been carried out. The insertion of the dummy metal is to enable the metal density to be within a certain range by, when there is an area in which the density of the wirings 3001 is low, as depicted in FIG. 34A, inserting dummy metal pieces 3007 into such an area, as depicted in FIG. 34B.

There is a first conventional method of inserting the dummy metal, which includes (a) determining the layout of the wirings, (b) inserting the dummy metal, (c) verifying the timing, (d) correcting the layout and (e) manufacturing (i.e. process) in this order. In addition, there is also a second conventional method, which includes (a) determining the layout of the wirings, (b) verifying the timing, (c) correcting the layout, (d) inserting the dummy and (e) manufacturing (i.e. process) in this order.

In the first conventional method, because the dummy metal is inserted during the design and the timing in the circuit into which the dummy metal was inserted is verified, the size of data used for the timing verification becomes large. However, because the timing verification is carried out for the circuit into which the dummy metal was inserted, it is possible to accurately carry out the timing verification. In addition, it becomes possible to optimize the timing and the dispersion of the wiring heights after taking into account the layout.

On the other hand, in the second method, because the dummy metal is inserted after the timing verification according to the design rule, the size of data used for the timing verification can be small. However, because the timing verification in which any margin is taken into account is carried out for the circuit without the dummy metal, the accuracy of the second method is lower than that of the first method. In addition, because the layout is not taken into account, the optimization cannot be carried out.

In the aforementioned techniques, when a method in which the dummy metal is inserted after the layout of the circuit is fixed is adopted, it is impossible to raise the accuracy of the timing verification. On the other hand, because the data size of the circuit layout data is already large before inserting the dummy metal due to development of the microfabrication and enlargement of the circuit, it is preferable to avoid that the data size is made larger due to the insertion of the dummy metal during the design.

SUMMARY

Accordingly, an object of the embodiments is to provide a technique enabling appropriate insertion of the dummy metal while suppressing the increase of the data used for the timing verification of the semiconductor circuit.

According to an aspect of this technique, a dummy metal insertion processing method includes: before carrying out a timing verification processing of a semiconductor circuit, preliminarily superposing and arranging a dummy pattern template representing an arrangement pattern of dummy metal, onto a layout area defined by layout data of the semiconductor circuit while changing an origin position of the dummy pattern template, to optimize the origin position of the dummy pattern template; and upon detecting that it is confirmed that a result of the timing verification processing has no problem, superposing and arranging the dummy pattern template onto the layout area defined by the layout data at the optimized origin position, to generate second layout data after inserting the dummy metal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a diagram to explain sub-areas;

FIG. 10 is a diagram to explain an inhibited area set to around a wiring segment;

FIG. 11 is a diagram to explain the arrangement of the dummy metal pieces;

FIG. 24 is a diagram depicting an example of data stored in the resistance and capacity variation calculation data storage in a modified embodiment 1;

FIG. 25 is a diagram depicting another example of data stored in the resistance and capacity variation calculation data storage in the modified embodiment 1;

FIGS. 34A and 34B are diagrams to explain conventional arts.

DESCRIPTION OF EMBODIMENTS

Figure 1:
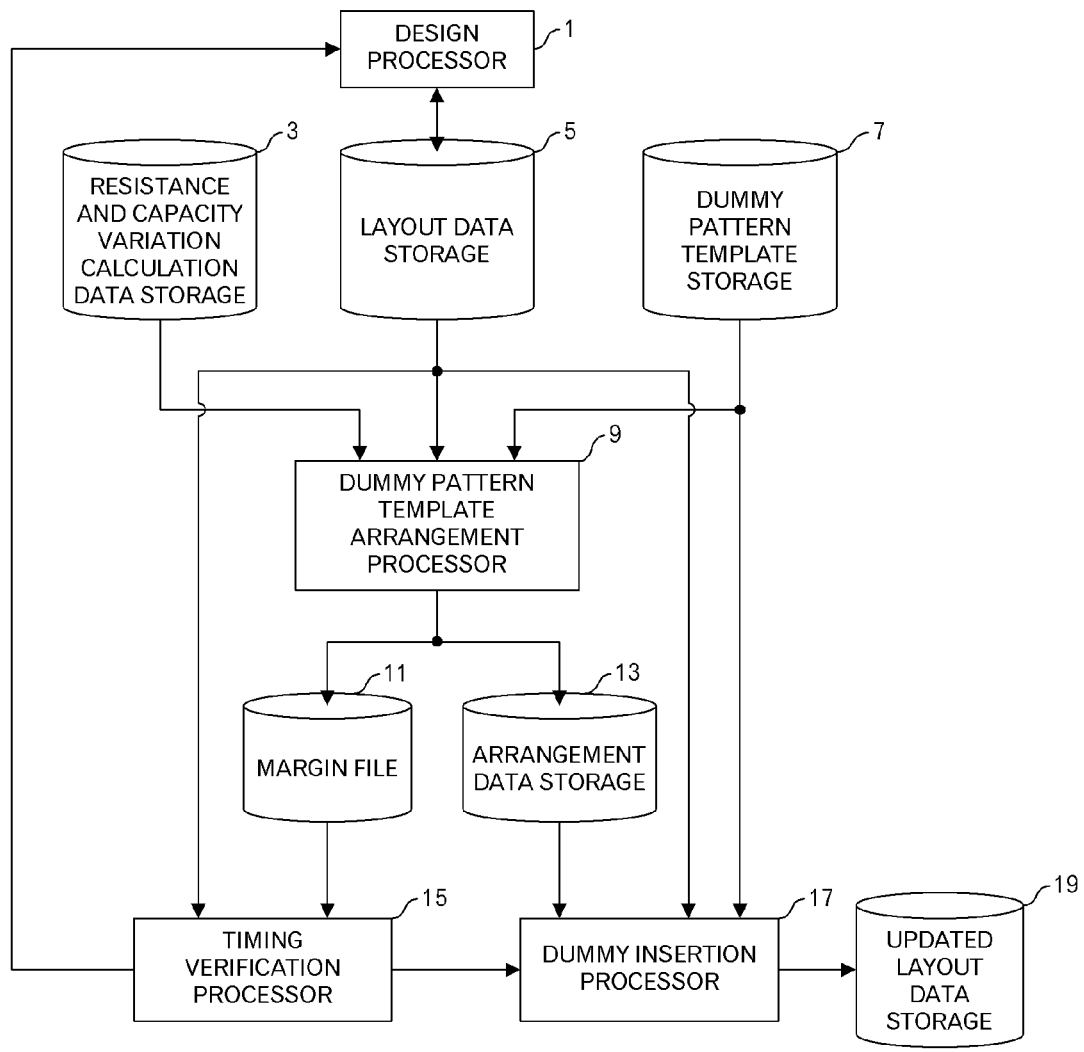
FIG. 1 is a functional block diagram of a semiconductor relating to an embodiment of this technology.

FIG. 1 depicts a functional block diagram of a semiconductor circuit design apparatus relating to an embodiment of this technique. The semiconductor circuit design apparatus includes a design processor 1 that carries out a well-known processing according to instructions from a user to generate layout data of the semiconductor circuit; a layout data storage 5 that stores layout data generated by the design processor 1; a dummy pattern template storage 7 that stores one or plural dummy pattern templates each representing template data of layout pattern of the dummy metal; a resistance and capacity variation calculation data storage 3 that stores data used to calculate variations of wiring resistance and wiring capacity; a dummy pattern template arrangement processor 9 that carries out a processing to appropriately arrange the dummy pattern template by using data stored in the layout data storage 5, the dummy pattern template storage 7 and the resistance and capacity variation calculation data storage 3; a margin file 11 that stores data of the wiring capacity variation and wiring resistance variation of each wiring segment, which are calculated by the dummy pattern template arrangement processor 9; an arrangement data storage 13 that stores the arrangement data of the dummy pattern template, which is identified by the dummy pattern template arrangement processor 9; a timing verification processor 15 that carries out a well-known timing verification processing for the semiconductor circuit by using data stored in the margin file 11 and the layout data storage 5; a dummy insertion processor 17 that carries out a well-known processing to insert the dummy metal to the layout data according to the dummy pattern template and its arrangement data by using data stored in the dummy pattern template storage 7, the layout data storage 5 and the arrangement data storage 13 when the timing verification processor 15 judged the result of the timing verification has no problem; and an updated layout data storage 19 that stores a processing result of the dummy insertion processor 17.

Incidentally, when the timing verification processor 15 judged that the result of the timing verification processing has a problem, the timing verification processor 15 may instruct the design processor 1 to modify the layout data after the notification to the user.

Figure 2:
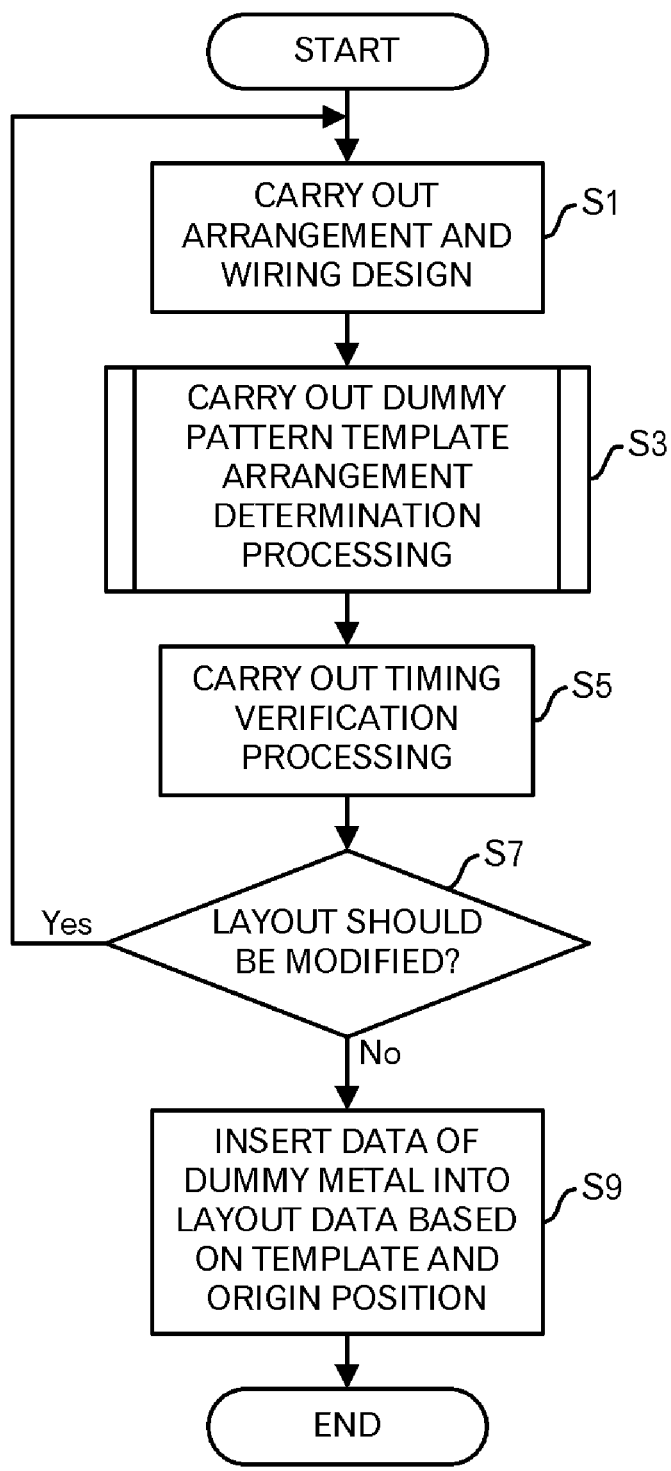
FIG. 2 is a diagram depicting a main processing flow in the embodiment.
Figure 3:
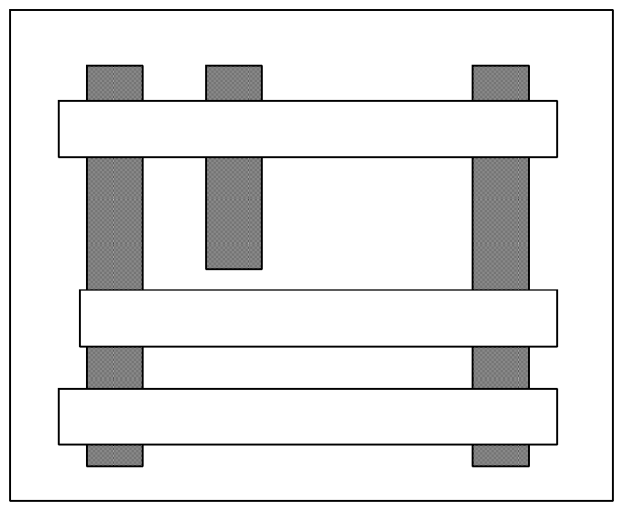
FIG. 3 is a diagram schematically depicting layout data.

Next, a processing carried out by the semiconductor design apparatus depicted in FIG. 1 will be explained by using FIGS. 2 to 31. First, the design processor 1 carries out a well-known arrangement and wiring design processing according to instructions from the user, and stores the layout data as a processing result into the layout data storage 5 (step S1). The layout data stored in the layout data storage 5 is data concerning the arrangement of the wirings and the like in each layer of the semiconductor chip as schematically depicted in FIG. 3 as a top view, and is not changed from the conventional one. Therefore, the further explanation for this step is omitted. Incidentally, in FIG. 3, the rectangular represents the wiring.

Next, the dummy pattern template arrangement processor 9 carries out a dummy pattern template arrangement determination processing by using data stored in the dummy pattern template storage 7, the layout data storage 5 and the resistance and capacity variation calculation data storage 3 (step S3). This processing is a main portion of this embodiment, and will be explained in detail later. Incidentally, in this dummy pattern template arrangement determination processing, the margin file 11 for the timing verification processing and the arrangement data including an origin position, which represents the arrangement position of the dummy pattern template. The arrangement data is stored in the arrangement data storage 13.

Then, the timing verification processor 15 carries out a well-known timing verification processing by using the margin file 11 generated by the dummy pattern template arrangement processor 9 and the layout data stored in the layout data storage 5 (step S5). In this embodiment, because the timing verification processing is carried out taking into account data of the wiring capacity variation and the wiring resistance variation of each wiring segment, which are caused by disposing the dummy pattern template, it is possible to accurately carry out a timing verification processing. However, because the dummy metal is not inserted into the layout data, data amount of the layout data itself does not increase.

Then, when it is judged that the result of the timing verification processing has a problem, namely, the layout modification is needed (step S7: Yes route), the timing verification processor 15 notifies the design processor 1 of that effect, and the processing returns to the step S1.

Figure 4:
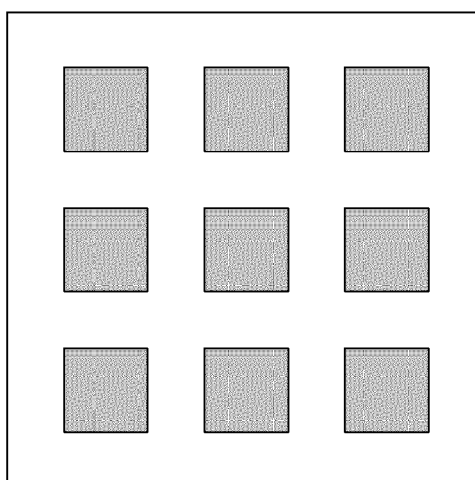
FIG. 4 is a diagram schematically depicting an example of a dummy pattern template.
Figure 5:
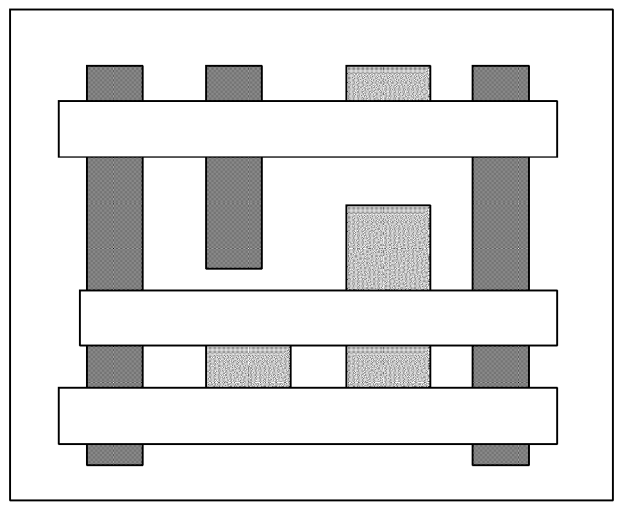
FIG. 5 is a diagram schematically depicting an example of a case wherein the dummy pattern template is inserted into the layout data.

On the other hand, when it is judged that the result of the timing verification processing has no problem, namely, the layout modification is not needed (step S7: No route), the dummy insertion processor 17 carries out a well-known processing to insert data of the dummy metal into the layout data stored in the layout data storage 5 according to the dummy pattern template stored in the dummy pattern template storage 7 and the arrangement data including the origin position of the dummy pattern template, and stores the processing result into the updated layout data storage 19 (step S9). For example, when the dummy pattern template, which is a template of the layout pattern of the dummy metal, as schematically depicted in FIG. 4, is used for the layout data as schematically depicted in FIG. 3, the layout data after the dummy metal insertion, as schematically depicted in FIG. 5, is stored into the updated layout data storage 19.

Figure 6:
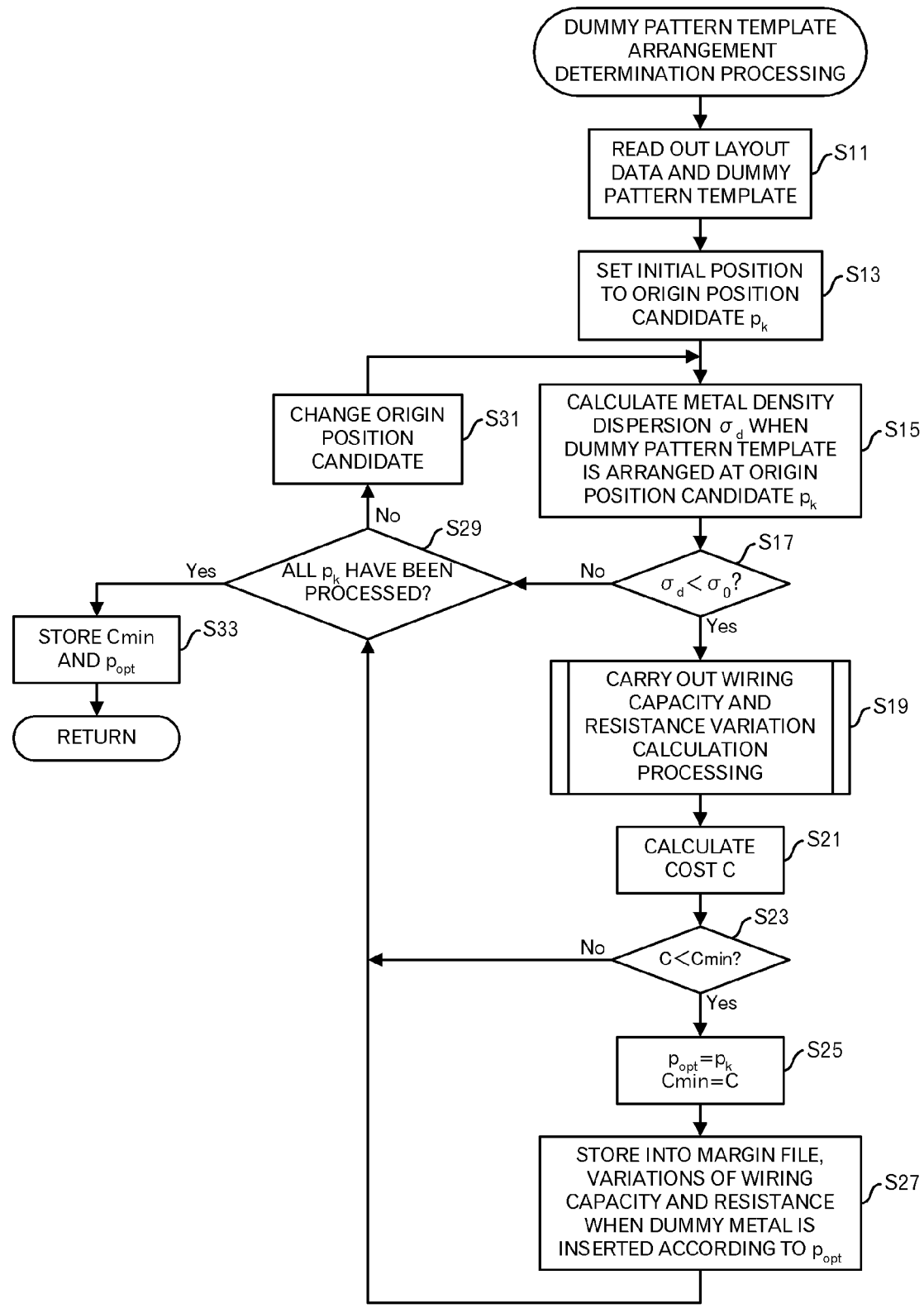
FIG. 6 is a diagram depicting a processing flow of a dummy pattern template arrangement determination processing.

Next, the dummy pattern template arrangement determination processing in FIG. 2 will be explained in detail by using FIGS. 6 to 31. First, the dummy pattern template arrangement processor 9 reads out the layout data from the layout data storage 5, and reads the dummy pattern template relating to this processing from the dummy pattern template storage 7 (FIG. 6: step S11). Here, it is assumed that only one dummy pattern template exists.

Figures 7A, 7B:
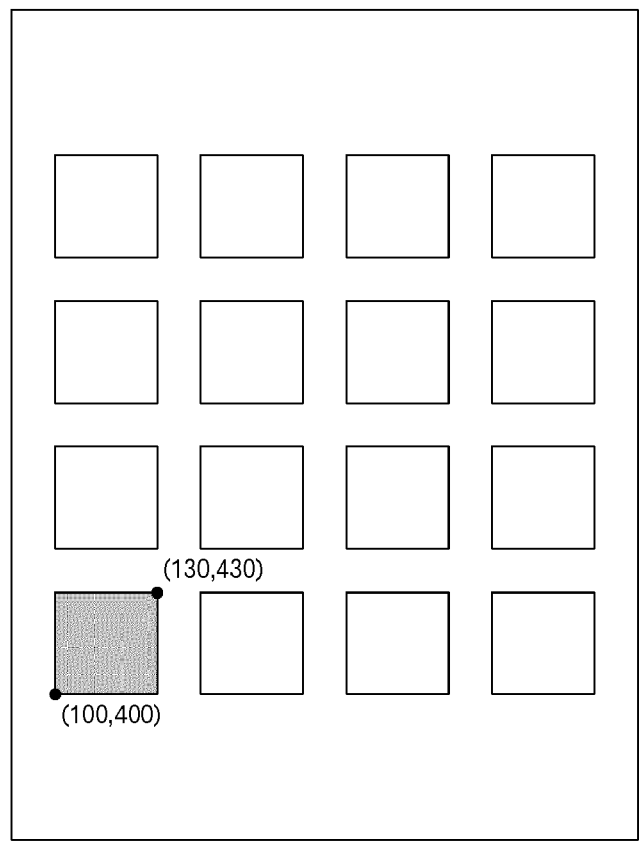
FIG. 7A is a diagram depicting a data example of the dummy pattern template.
FIG. 7B is a diagram to explain coordinate positions of dummy metal pieces in a case of the origin position (100, 400)

Data of the dummy pattern template is data as depicted in FIG. 7A, for example. In the example of FIG. 7A, the first line represents identification information (Template 1) of a dummy pattern template, the second line represents the number (16) of dummy metal pieces included in this dummy pattern template, the third line represents a range in which the dummy metal in this dummy pattern template is arranged, and the fourth line and subsequent lines represent lower left coordinates (e.g. (0.0)) and upper right coordinates (e.g. (30, 30)) of each dummy metal piece. For example, in a case of the dummy metal surrounded by dotted lines, when the origin candidate position $p_k$ is (100, 400), the dummy metal with the hatching is indicated as depicted in FIG. 7B, and the lower left coordinates are (100, 400), and the upper right coordinates are (130, 430).

Next, the dummy pattern template arrangement processor 9 sets an initial position (e.g. lower left (0, 0)) to an origin position candidate $p_k$ of the dummy pattern template (step S13). In addition, the dummy pattern template arrangement processor 9 calculates the dispersion $\sigma_d$ of the metal density according to the well-known method when the dummy pattern template is arranged at the origin position candidate $p_k$ by the well-known method (step S15). Then, the dummy pattern template arrangement processor 9 judges whether or not a condition $\sigma_d < \sigma_0$ (i.e. a predetermined threshold) is satisfied (step S17). When the condition $\sigma_d < \sigma_0$ is not satisfied (step S17: No route), the dummy pattern template arrangement processor 9 judges whether or not all of $p_k$ have been processed (step S29), because the present origin position candidate $p_k$ cannot be adopted. That is, it is judged whether or not all values in a range to be allocated for the origin candidate $p_k$ have been processed.

When any unprocessed origin position candidate $p_k$ exists (step S29: No route), the dummy pattern template arrangement processor 9 changes the origin position candidate $p_k$ so as to shift it by ($\Delta dx$, $\Delta dy$), for example, in a direction of the wiring (step S31), and the processing returns to the step S15. All points in the layout area (a predetermined region onto which the wiring and the like can be arranged) on the semiconductor chip may be thoroughly set to the origin position candidate $p_k$.

When it is judged at the step S17 that the condition $\sigma_d < \sigma_0$ is satisfied, the dummy template pattern arrangement processor 9 carries out a wiring capacity and resistance variation calculation processing (step S19). This processing will be explained by using FIGS. 8 to 21.

Figure 8:
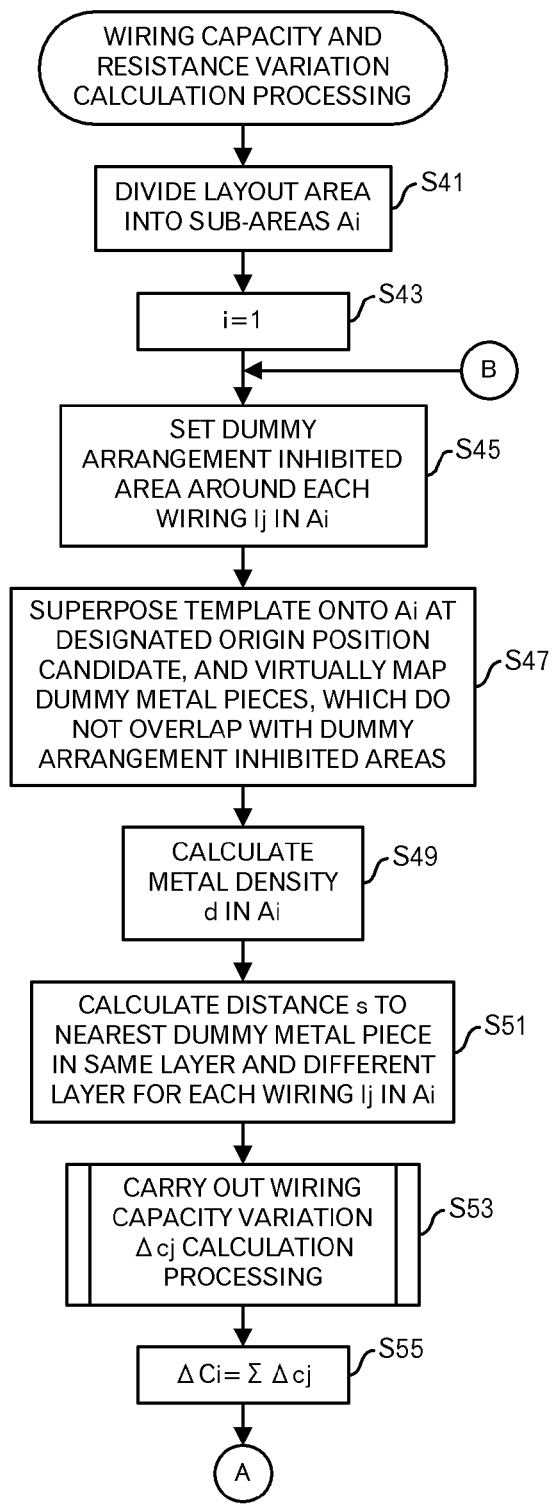
FIG. 8 is a diagram depicting a processing flow of a wiring capacity and resistance variation calculation processing.

First, as schematically depicted in FIG. 9, the dummy pattern template arrangement processor 9 divides the layout area into sub-areas Ai (i is an integer equal to or greater than 1 and equal to or less than n) (FIG. 8: step S41). Then, the dummy pattern template arrangement processor 9 initializes i to 1 (step S43). Moreover, the dummy pattern template arrangement processor 9 sets a predetermined dummy arrangement inhibited area surrounding each wiring $l_j$ (j is an integer equal to or greater than 1 and equal to or less than m) in the sub-area Ai (step S45). The following processing is carried out for each layer. As schematically depicted in FIG. 10, a predetermined dummy arrangement inhibited area 1003 is set around a wiring 1001. Then, the dummy pattern template arrangement processor 9 virtually maps dummy metal pieces, which do not overlap with any dummy arrangement inhibited areas, by superposing the dummy pattern template onto the sub-area Ai at the designated origin position candidate Pk (step S47). As schematically depicted in FIG. 11, when the dummy pattern template is arranged at the origin position candidate $p_k$, the dummy metal piece 1005, which overlaps with the dummy arrangement inhibited area 1003, is not arranged, and only the dummy metal piece 1007, which does not overlap with any dummy arrangement inhibited area 1003, is virtually superposed and arranged onto the layout data of the sub-area Ai.

Then, the dummy pattern template arrangement processor 9 calculates a metal density d in the sub-area Ai by a well-known method (step S49). In addition, the dummy pattern template arrangement processor 9 calculates a distance s from the wiring $l_j$ in the sub-area Ai to the nearest dummy metal piece in the same layer and the different layers (i.e. upper and/or lower layers, if there are upper and/or lower layers), and stores the distance s into a storage device such as a main memory (step S51). In this embodiment, as schematically depicted in FIG. 11, when the dummy metal piece 1007 in the same later is nearest, the distance s with the dummy metal piece 1007 is calculated. Incidentally, when a dummy metal piece in a different layer is nearer, the distance with the dummy metal piece in the different layer is calculated.

Then, the dummy pattern template arrangement processor 9 carries out a wiring capacity variation $\Delta cj$ calculation processing in the dummy insertion (step S53). The wiring capacity variation $\Delta cj$ calculation processing will be explained by using FIG. 12.

Figure 12:
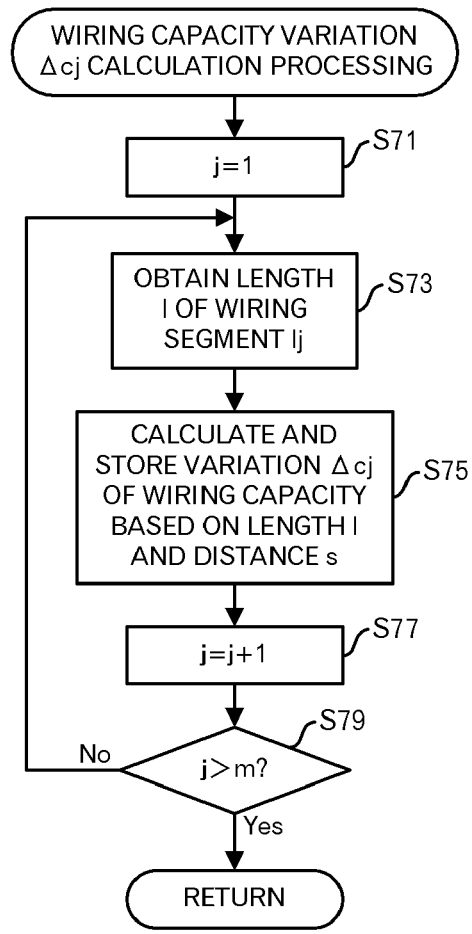
FIG. 12 is a diagram depicting a processing flow of a wiring capacity variation $\Delta cj$ calculation processing.

First, the dummy pattern template arrangement processor 9 initializes j to 0 (FIG. 12: step S71). Then, the dummy pattern template arrangement processor 9 obtains a length l of the wiring segment $l_j$ (step S73). For example, it is obtained from the layout data. The length l of the wiring segment is a length l of the wiring 1001 as depicted in FIG. 11, for example. Then, the dummy pattern template arrangement processor 9 calculates a variation $\Delta cj$ of the wiring capacity based on the length l and the distance s by using data stored in the resistance and capacity variation calculation data storage 3, and stores the variation into the storage device such as the main memory (step S75).

Figure 13:
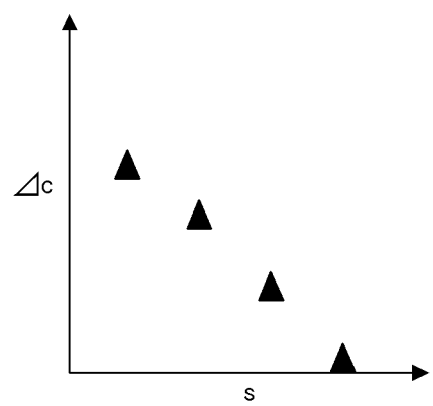
FIG. 13 is a diagram schematically depicting a relation among a wiring capacity variation $\Delta c$ and a distance $s$ between the wiring segment and the nearest dummy metal piece.

In this embodiment, a relational expression among the variation $\Delta c$ of the wiring capacity, the length l of the wiring segment and the distance s between the wiring segment and the nearest dummy metal piece is calculated for each technology by carrying out a fitting based on values analyzed by a simulator in advance. For example, $\Delta c$ is approximated by a function of s and l (e.g. $\Delta c=(\alpha*s+\beta)*l$) and $\alpha$ and $\beta$ are calculated from the results (relation between s and $\Delta c$) of the simulation as schematically depicted in FIG. 13. Incidentally, in FIG. 13, points are plotted in the premise that $\Delta c$ per a unit length of 1 is calculated. In addition, $\alpha$ and $\beta$ are different according to the layer.

Similarly, a relational expression between the variation $\Delta r$ of the wiring resistance and the metal density d are calculated for each technology by carrying out a fitting based on values analyzed by a simulator in advance. For example, $\Delta r$ is approximated by a function of d (e.g. $\Delta r=\gamma*d+\delta$), and $\gamma$ and $\delta$ are calculated from the result (relation between d and $\Delta r$) of the simulation as schematically depicted in FIG. 14.

Figures 14, 15, 16A, 16B:
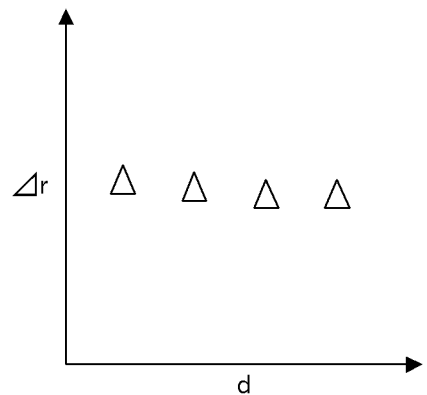
FIG. 14 is a diagram schematically depicting a relation between a wiring resistance variation Δr and metal density d.
FIG. 15 is a diagram depicting an example of data stored in the resistance and capacity variation calculation data storage.
FIGS. 16A and 16B are diagrams depicting an example of data stored in the resistance and capacity variation calculation data storage.

Therefore, data as depicted in FIG. 15 is stored into the resistance and capacity variation calculation data storage 3. In the example of FIG. 15, for each layer number, a value of $\alpha$, a value of $\beta$, a value of $\gamma$ and a value of $\delta$ are registered, and $\Delta c$ and $\Delta r$ are calculated by substituting those values into the aforementioned expressions.

In addition, data as depicted in FIGS. 16A and 16B is stored in the resistance and capacity variation calculation data storage 3. In the example of FIG. 16A, the relation between the distance s and the wiring capacity variation $\Delta c$ is tabulated for each layer. Namely, values of the distance s are enumerated, for example, at 0.1 intervals, and values of $\Delta c$, which respectively correspond to the values of the distance, are enumerated. Incidentally, because the value of $\Delta c$ is a value per a unit length of l, the calculation of the length l times is needed. In the example of FIG. 16B, the relation between the metal density d and the wiring resistance variation $\Delta r$ is tabulated for each layer. That is, values of the metal density d are enumerated, for example, at 0.1 intervals, and values of $\Delta r$, which respectively correspond to the values of the metal density, are enumerated. By referring to such tables, values can be immediately obtained without any calculation by the calculation expression.

The dummy pattern template arrangement processor 9 calculates the wiring capacity variation $\Delta cj$ corresponding to the length l and the distance s by using data as depicted in FIGS. 15 and 16, and stores the wiring capacity variation into the storage device such as the main memory (step S75).

After that, the dummy pattern template arrangement processor 9 increments j by 1 (step S77), and judges whether or not j exceeds the number m of wiring segments (step S79). When j does not exceed the number m of wiring segments, the processing returns to the step S73. On the other hand, when j exceeds the number m of wiring segments, the processing returns to the original processing.

Returning to the explanation of FIG. 8, next, the dummy pattern template arrangement processor 9 calculates a cost $\Delta Ci$ (=$\Sigma\Delta cj$) for the sub-area Ai, which is a total sum of $\Delta cj$ calculated at the step S53 (step S55). The processing shifts to a processing in FIG. 17 through a terminal A.

Figure 17:
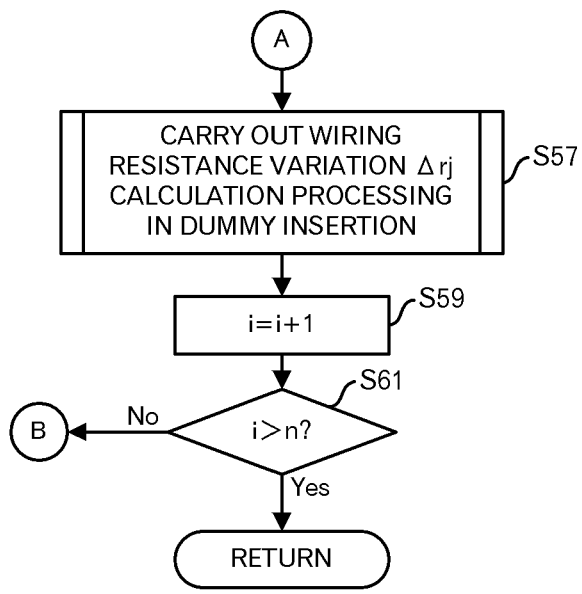
FIG. 17 is a diagram depicting a processing flow of a wiring capacity and resistance variation calculation processing.
Figure 18:
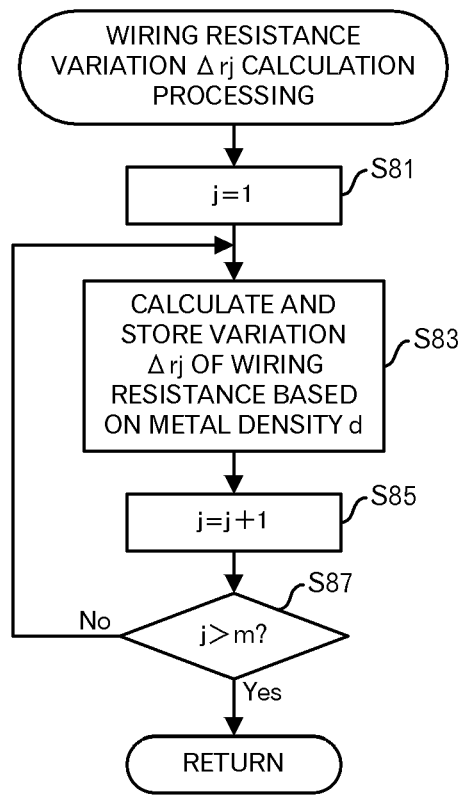
FIG. 18 is a diagram depicting a processing flow of a wiring resistance variation Δrj calculation processing.

Shifting to the explanation of the processing of FIG. 17, the dummy pattern template arrangement processor 9 carries out a wiring resistance variation $\Delta r$ calculation processing in the dummy insertion (step S57). The wiring resistance variation $\Delta r$ calculation processing will be explained by using FIG. 18. First, the dummy pattern template arrangement processor 9 initializes j to 1 (step S81). Then, the dummy pattern template arrangement processor 9 calculates a variation $\Delta rj$ of the wiring resistance based on the metal density d, and stores the variation into the storage device such as the main memory (step S83). The calculation in this step is carried out by using data stored in the resistance and capacity variation calculation data storage 3. That is, when data as depicted in FIG. 15 is stored, the dummy pattern template arrangement processor 9 reads out pertinent values of $\gamma$ and $\delta$, and calculates $\Delta r=\gamma*d+\delta$. On the other hand, when data as depicted in FIG. 16B, the dummy pattern template arrangement processor 9 reads out $\Delta r$ corresponding to d. Incidentally, the wiring resistance variation $\Delta rj$ is calculated for each wiring lj, here. However, when the metal density d is uniform in the sub-area Ai, the same wiring resistance variation is calculated in the same sub-area Ai. Then, the dummy pattern template arrangement processor 9 increments j by 1 (step S85), and judges whether or not j exceeds the number m of wiring segments (step S87). When j does not exceed the number m of wiring segments, the processing returns to the step S83. On the other hand, when j exceeds the number m of wiring segments, the processing returns to the original processing.

Returning to the explanation of the processing in FIG. 17, the dummy pattern template arrangement processor 9 increments i by 1 (step S59), and judges whether or not i exceeds the number n of sub-areas (step S61). When i does not exceed the number n of sub-areas, the processing returns to the step S45 through a terminal B. On the other hand, when i exceeds the number n of sub-areas, the processing returns to the original processing.

Thus, the wiring capacity variation $\Delta cj$ and wiring resistance variation $\Delta rj$ are calculated for each wiring $l_j$.

Figures 19, 20, 21:
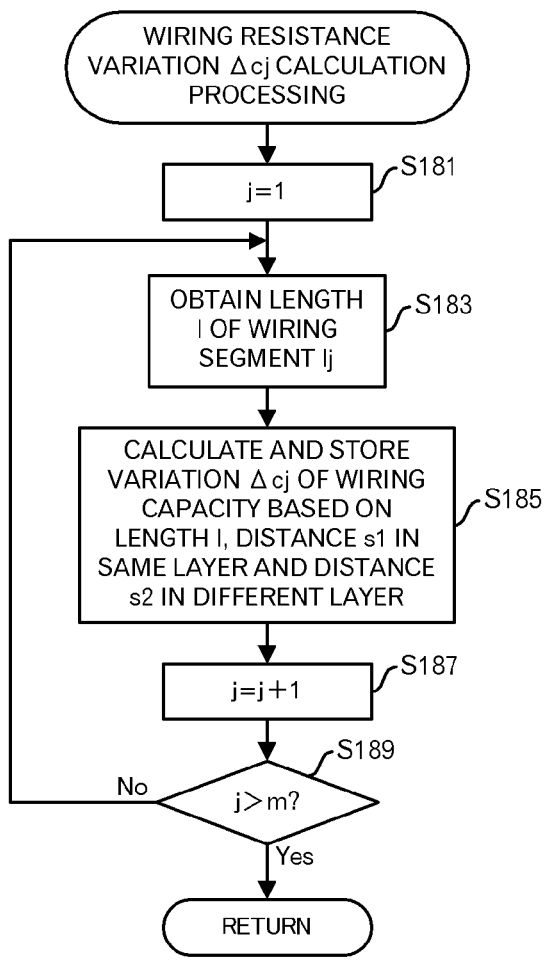
FIG. 19 is a diagram depicting an example of data stored in a margin file.
FIG. 20 is a diagram depicting an example of data stored in the arrangement data storage.
FIG. 21 is a diagram depicting a processing flow of a wiring capacity variation Δcj calculation processing.

Returning to the explanation of FIG. 6, the dummy pattern template arrangement processor 9 calculates a cost C (=$\Sigma Ci$), which is a total sum of the wiring capacity variations (which is also called the wiring capacity increase), and stores the cost into the storage device such as the main memory (step S21). Then, the dummy pattern template arrangement processor 9 judges whether or not the cost C calculated in this time is less than the current minimum cost Cmin (step S23). When the current minimum cost Cmin is equal to or less than the cost C calculated in this time, the processing shifts to step S29. On the other hand, when the cost C calculated in this time is less than the current minimum cost Cmin, the dummy pattern template arrangement processor 9 substitutes the cost C calculated in this time into Cmin, and substitutes the origin position candidates $p_k$ in this time into the current optimal origin position $p_{opt}$ (step S25). Furthermore, the dummy pattern template arrangement processor 9 stores into the margin file 11, variations of the wiring capacity and wiring resistance when the dummy metal insertion is carried out by arranging the dummy pattern template at the current optimal origin position $p_{opt}$ (step S27). An example of data stored in the margin file 11 is depicted in FIG. 19. In the example of FIG. 19, the wiring capacity variation $\Delta c$ and the wiring resistance variation $\Delta r$ are registered for each wiring segment number. Although it is described above, the margin file 11 is used for the well-known timing verification processing, and it is possible to carry out an accurate timing verification processing by generating and using the margin file 11. Incidentally, whenever it is judged at the step S23 that the cost C calculated in this time is less, the margin file 11 is updated. In addition, the processing shifts to the step S29 after the step S27.

When it is judged at the step S29 that all of the origin position candidates $p_k$ have been processed, the dummy pattern template arrangement processor 9 stores the current minimum cost Cmin and the optimum origin position $p_{opt}$ into the arrangement data storage 13 (step S33). For example, data as depicted in FIG. 20 is stored. In the example of FIG. 20, the optimum origin position $p_{opt}$=(100, 400) and Cmin=100 are stored. However, Cmin may not be stored. Then, the processing returns to the original processing.

By carrying out the aforementioned processing, the origin position of the dummy pattern template, which causes the cost C, which is a total sum of the wiring capacities, to be minimized, is identified and the margin file 11 at that time is also generated.

Although it is described above, in the dummy pattern template arrangement determination processing, the dummy pattern template is preliminarily superposed, but the layout data itself is not changed. Therefore, the layout data does not increase. However, by using the margin file representing the influence in a case where the dummy pattern template is arranged, in the timing verification processing, it becomes possible to carry out an accurate timing verification processing.

Modified Embodiment 1

Figure 22:
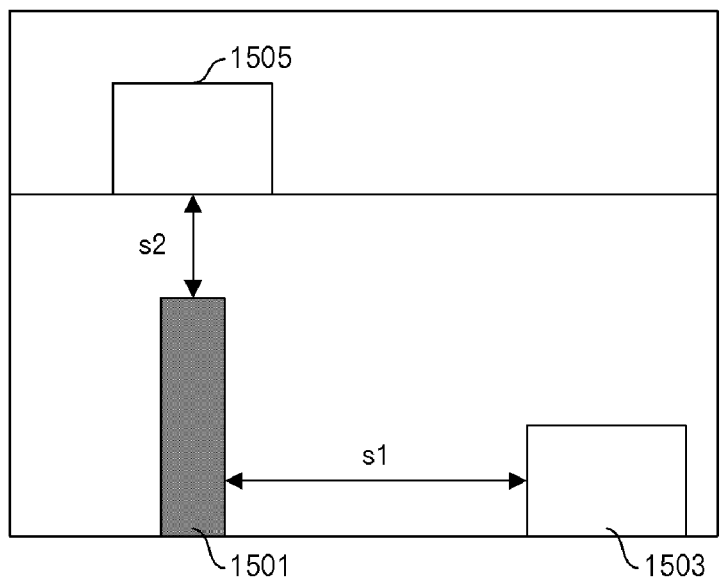
FIG. 22 is a schematic diagram to explain the distance between the wiring segment and the nearest dummy metal piece in the same layer and the distance between the wiring segment and the nearest dummy metal piece in the different layer.

In the example depicted in FIG. 12, the wiring capacity variation $\Delta c$ is calculated by detecting one nearest dummy metal piece for a specific wiring segment $l_j$ and using only the distance s between the specific wiring segment $l_j$ and the nearest dummy metal piece. In the first modified embodiment, on behalf of the processing flow in FIG. 12, the processing flow as depicted in FIG. 21 is adopted. However, as depicted in FIG. 22, both of the distance s1 from the wiring segment 1501 to the nearest dummy metal piece 1503 in the same layer and the distance s2 from the wiring segment 1501 to the nearest dummy metal piece 1505 in the different layer are obtained at the step S51.

Figure 23:
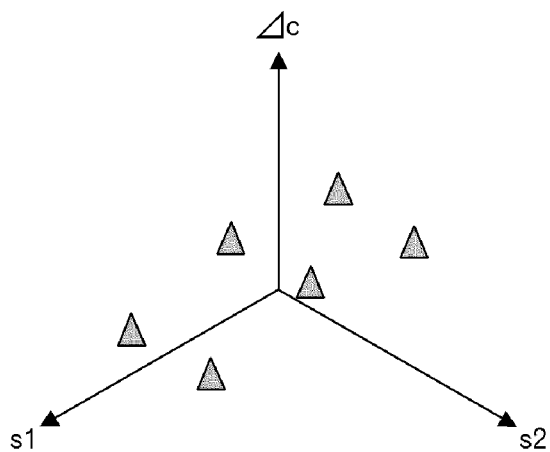
FIG. 23 is a diagram schematically depicting a relation between the wiring capacity variation Δc and the distances s1 and s2.

Furthermore, a relational expression among the wiring capacity variation $\Delta c$, the length l of the wiring segment and the distances s1 and s2 are calculated for each technology by carrying out a fitting based on values analyzed by the simulator in advance. For example, assuming that $\Delta c$ can be approximated by a function of s1, s2 and l (e.g. $\Delta c = \alpha*s1 + \beta*s2 + \gamma)*l$), $\alpha$, $\beta$ and $\gamma$ are calculated from the simulation results (i.e. relation between $\Delta c$ and s1 and s2) as depicted in FIG. 23. Incidentally, in FIG. 23, $\Delta c$ per a unit length of l is calculated and points are plotted. In addition, values of $\alpha$, $\beta$ and $\gamma$ are different according to the layer.

Therefore, data as depicted in FIG. 24 is stored in the resistance and capacity variation calculation data storage 3, for example. In the example of FIG. 24, only data for the wiring capacity variation $\Delta c$ calculation is depicted, and for each layer number, values of $\alpha$, $\beta$ and $\gamma$ are registered.

In addition, the values of the wiring capacity variations $\Delta c$ themselves may be registered in association with combinations of the distances s1 and s2 instead of the coefficients as depicted in FIG. 24. As depicted in FIG. 25, the values of s1 are enumerated at 0.1 intervals, the values of s2 are enumerated at 0.1 intervals, and the wiring capacity variation $\Delta c$ per a unit length of the wiring segment are registered in association with each combination of the values of s1 and s2. The table as depicted in FIG. 25 is prepared for each layer number.

Figure 26:
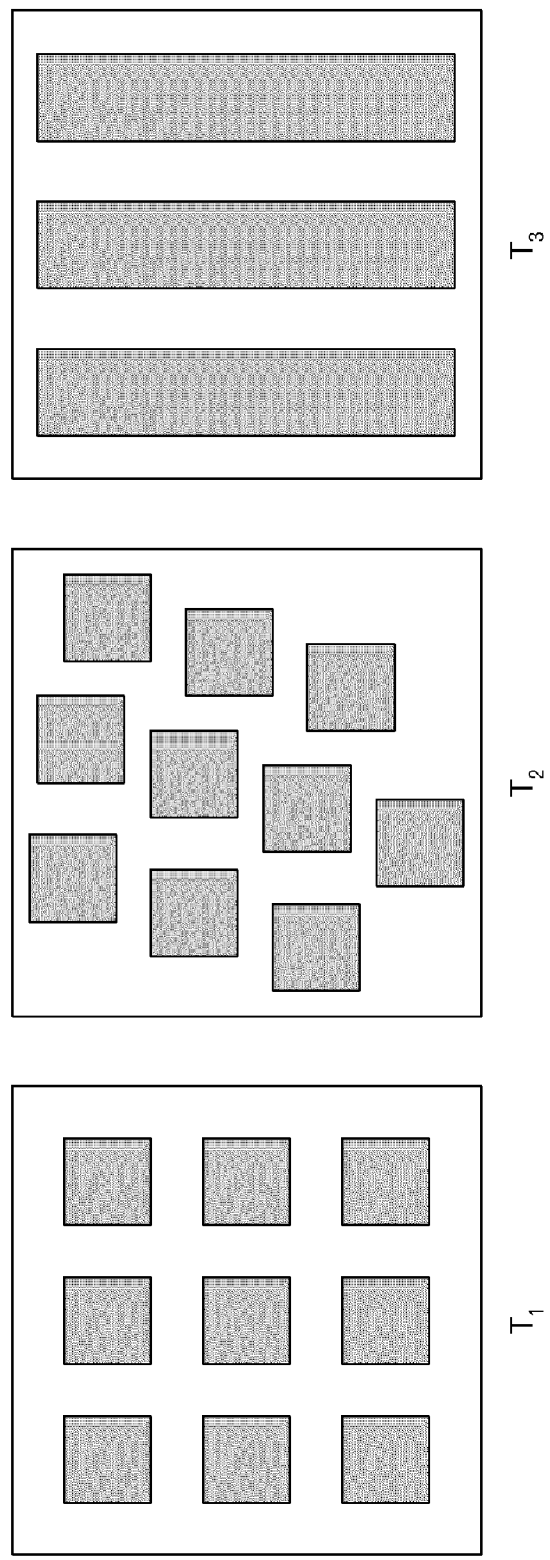
FIG. 26 is a diagram schematically depicting plural dummy pattern templates used in a modified embodiment 2.

Under such a premise, a processing depicted in FIG. 21 is carried out. The dummy pattern template arrangement processor 9 initializes j to 1 (step S81). Then, the dummy pattern template arrangement processor 9 obtains the length l of the wiring segment $l_j$ (step S83). Furthermore, the dummy pattern template arrangement processor 9 calculates a variation $\Delta c_j$ of the wiring capacity based on the distance s1 in the same layer and the distance s2 in the different layer by using data stored in the resistance and capacity variation calculation data storage 3, and stores the variation into the storage device such as the main memory (step S85). When the data as depicted in FIG. 24 is stored, the variation is calculated according to $\Delta c = (\alpha*s1 + \beta*s2 + \gamma)*l$. In addition, when the data as depicted in FIG. 26 is stored, a value corresponding to the distances s1 and s2 is read out, and the product of the read value and l is calculated.

Then, the dummy pattern template arrangement processor 9 increments j by 1 (step S87), and judges whether or not j exceeds the number m of wiring segments (step S89). When j does not exceed the number m of wiring segments, the processing returns to the step S83. On the other hand, when j exceeds the number m of wiring segments, the processing returns to the original processing.

Thus, it is possible to accurately calculate the wiring capacity variation $\Delta c_j$.

Modified Embodiment 2

In the aforementioned examples, one kind of dummy pattern template is used. However, plural kinds of dummy pattern templates may be used. As schematically depicted in FIG. 26, a template $T_1$ in which small dummy metal pieces are aligned in both of vertical and horizontal directions, a template $T_2$, in which small dummy metal pieces are distributedly arranged, and a template $T_3$, in which oblong dummy metal pieces are arranged in a horizontal direction may be used. However, the number of kinds are not limited to 3, and other templates may be additionally adopted. Furthermore, two of the depicted templates may be used.

Figure 27:
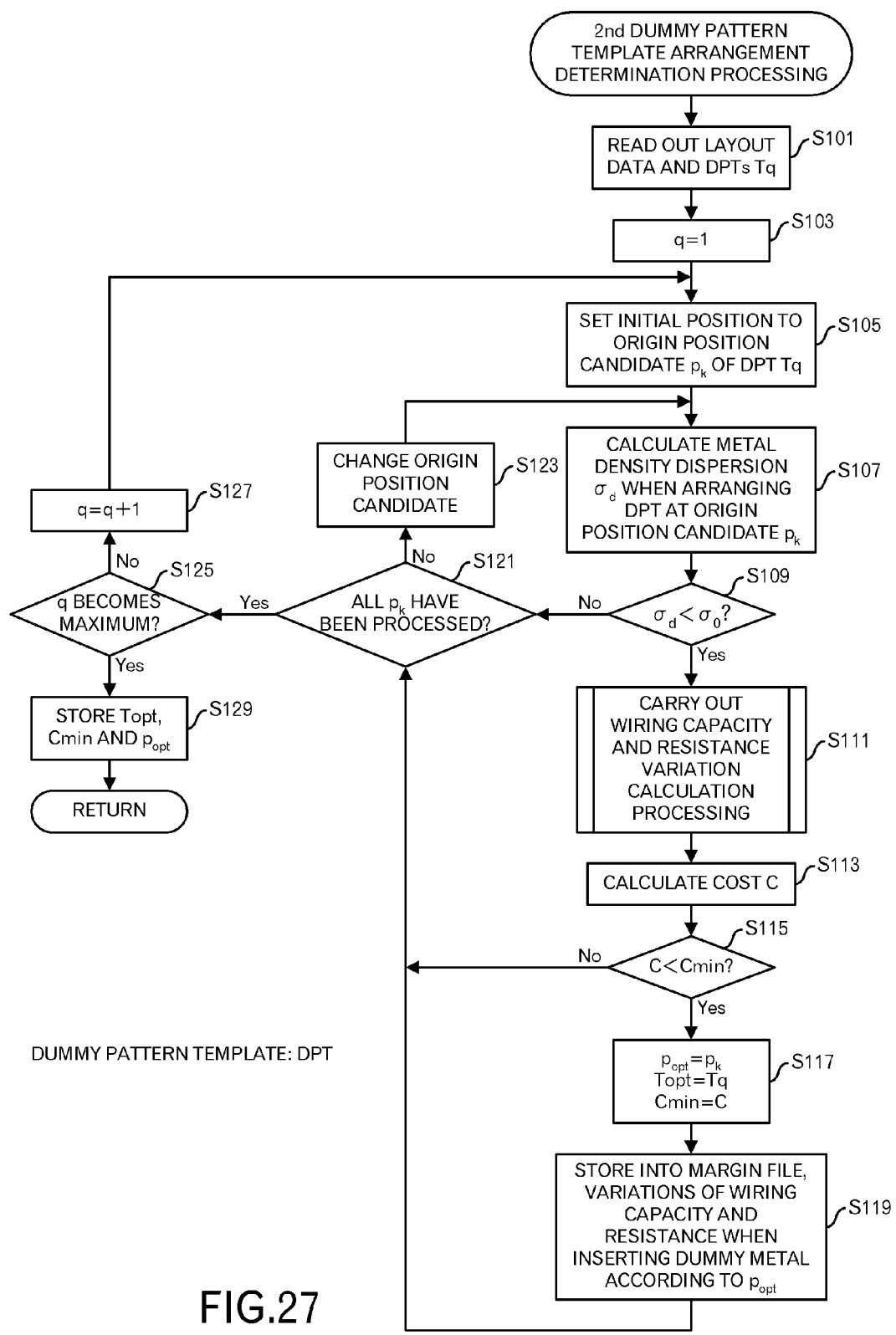
FIG. 27 is a diagram depicting a processing flow of the dummy pattern template arrangement determination processing in the modified embodiment 2.

In such a modified case, the dummy pattern template arrangement determination processing is carried out as depicted in FIG. 27.

First, the dummy pattern template arrangement processor 9 reads out layout data from the layout data storage 5, and reads out all dummy pattern templates Tq (q are integers equal to or greater than 1 and equal to or less than the number of dummy pattern templates) from the dummy pattern template storage 7 (FIG. 27: step S101). Then, the dummy pattern template arrangement processor 9 initializes q to 1 (step S103).

Next, the dummy pattern template arrangement processor 9 sets an initial position (e.g. lower left point (0, 0)) to the origin position candidate $p_k$ of the dummy pattern template Tq (step S105). In addition, the dummy pattern template arrangement processor 9 calculates the metal density dispersion $\sigma_d$ in a case where the dummy pattern template Tq is arranged at the origin position candidate $p_k$, according to a well-known method (step S107). Then, the dummy pattern template arrangement processor 9 judges whether or not $\sigma_d < \sigma_0$ is satisfied (step S109). When a condition of $\sigma_d < \sigma_0$ is not satisfied (step S109: No route), the dummy pattern template arrangement processor 9 judges whether or not all of $p_k$ have been processed, because the present origin position candidate $p_k$ cannot be adopted (step S121). Namely, it is judged whether or not all possible values for the origin position candidate $p_k$ have been processed.

When any unprocessed origin position candidates $p_k$ exist (step S121: No route), the dummy pattern template arrangement processor 9 changes the origin candidate $p_k$ so as to shift it by ($\Delta dx$, $\Delta dy$) for example, in a wiring direction (step S123), and the processing returns to the step S107. All points in the layout area on the semiconductor chip may be thoroughly set to the origin position candidate $p_k$.

When it is judged at the step S109 that the condition of $\sigma_d < \sigma_0$ is satisfied, the dummy pattern template arrangement processor 9 carries out the wiring capacity and resistance variation calculation processing (step S111). This processing is the same as the processing explained by using FIG. 8 and the like.

The dummy pattern template arrangement processor 9 calculates a cost C ($=\Sigma \Delta C i$), which is a total sum of the wiring capacity variations (also called the wiring capacity increase), and stores the cost into the storage device such as the main memory (step S113). Then, the dummy pattern template arrangement processor 9 judges whether or not the cost C calculated in this time is less than the present minimum cost Cmin (step S115). When the present minimum cost Cmin is equal to or less than the cost C calculated in this time, the processing shifts to step S121. On the other hand, when the cost C calculated in this time is less than the present minimum cost Cmin, the dummy pattern template arrangement processor 9 substitutes the cost C calculated in this time into Cmin, substitutes the present origin position candidate $p_k$ into the present optimum origin position $p_{opt}$, and substitutes an ID of the dummy pattern template Tq relating to this processing into a variable Topt to store an ID of the optimum dummy pattern template (step S117). Furthermore, the dummy pattern template arrangement processor 9 stores the variations of the wiring capacity and wiring resistance in a case where the dummy metal insertion is carried out by arranging the dummy pattern template Tq at the present optimum origin position $p_{opt}$, into the margin file 11 (step S119). Then, the processing shifts to step S121 after the step S119.

When it is judged at the step S121 that all of the origin position candidates $p_k$ have been processed, the dummy pattern template arrangement processor 9 judges whether or not q reached the maximum value (step S125). When q dose not reach the maximum value, the dummy pattern template arrangement processor 9 increments q by 1 (step S127) and the processing returns to the step S105.

Figures 28, 29:
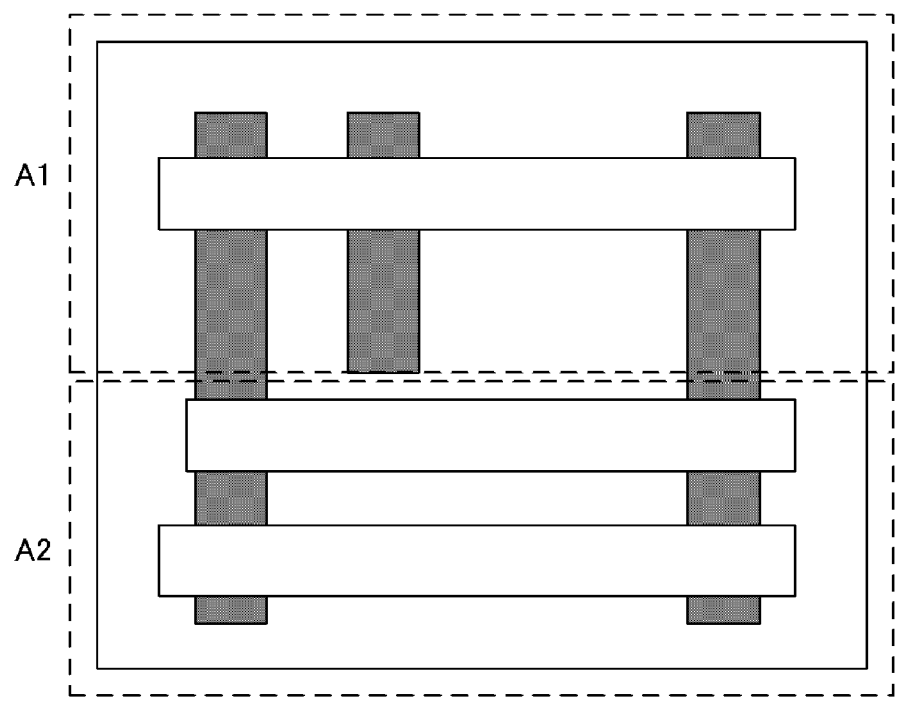
FIG. 28 is a diagram depicting an example of data stored in the arrangement data storage in the modified embodiment 2.
FIG. 29 is a schematic diagram to explain the division of the layout area.

On the other hand, when q reached the maximum value, the dummy pattern template arrangement processor 9 stores the present minimum cost Cmin, the optimum dummy pattern template Topt and the optimum origin position $p_{opt}$ into the arrangement data storage 13 (step S129). For example, data as depicted in FIG. 28 is stored. In the example of FIG. 28, a template number (T3), the origin (X,Y) (=(5000, 2500)) and Cmin (=30) are stored. However, Cmin may not be stored. Then, the processing returns to the original processing.

By carrying out the aforementioned processing, it becomes possible to identify the dummy pattern template, which causes the cost C, which is the total sum of the wiring capacities, to be minimized, and the origin position at which that dummy pattern template is arranged, and generate the margin file 11 for that situation.

Modified Embodiment 3

In the aforementioned examples, the processing is carried out on such a premise that the layout area is one area. In this modified embodiment, as schematically depicted in FIG. 29, the layout area is divided into plural areas, the optimum dummy pattern template is selected for each of the plural areas, and the optimum origin position is identified for each of the optimum dummy pattern templates.

Figures 30, 31:
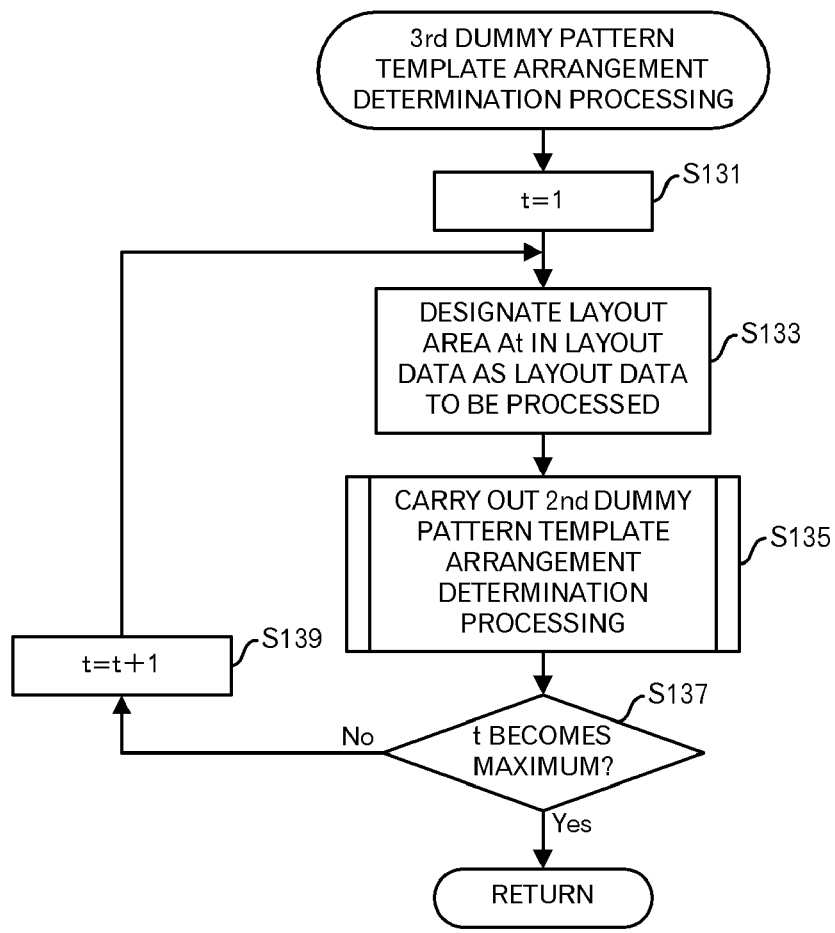
FIG. 30 is a diagram depicting a processing flow of the dummy pattern template arrangement determination processing in a modified embodiment 3.
FIG. 31 is a diagram depicting an example of data stored in the arrangement data storage in the modified embodiment 3.

Then, a processing as depicted in FIG. 30 is carried out. First, the dummy pattern template arrangement processor 9 initializes a counter t of the divided layout areas to 1 (step S131). Then, the dummy pattern template arrangement processor 9 designates a layout area At in the layout data as layout data to be processed (step S133). Then, the dummy pattern template arrangement processor 9 carries out a second dummy pattern template arrangement determination processing depicted in FIG. 27 for the layout area At (step S135). Incidentally, in the step S129 depicted in FIG. 27, Topt, Cmin and $p_{opt}$ are stored in association with an ID of the layout area At into the arrangement data storage 13. In addition, the margin file 11 is generated for each layout area.

Then, the dummy pattern template arrangement processor 9 judges whether or not t reached the maximum value (step S137), and when t does not reach the maximum value, the dummy pattern template arrangement processor 9 increments t by 1 (step S139), and the processing returns to the step S133. On the other hand, when t has been reached the maximum value, the processing returns to the original processing.

By carrying out such a processing, data as depicted in FIG. 31 is stored into the arrangement data storage 13. In the example of FIG. 31, an area number of the layout area, a template number of the optimum dummy pattern template, the optimum origin position (X, Y) and Cmin are registered.

By carrying out the aforementioned processing, the much preferable dummy pattern template is selected, for each layout area, as a whole, and the optimum origin position is also identified for each layout area.

Although the embodiments of this technology are explained above, this technology is not limited to these embodiments. For example, the functional block diagram in FIG. 1 is a mere example, and may not be always identical with any actual program module configuration.

Furthermore, in the processing flow, as long as the same processing result is obtained, the order of the steps may be exchanged and, or the steps may be executed in parallel.

Furthermore, although the layout area is divided in the modified embodiment 3, the dummy pattern template may be changed according to the layers to optimize the dummy pattern template in each layer.

Incidentally, when the variation of the wiring capacity is simulated while shifting the dummy pattern template, it is understood that the wiring capacity varies about 7% by the shift of the dummy pattern template. Therefore, by adopting such a configuration, the origin position of the dummy pattern template is identified, and when there is no problem, the origin position and the dummy pattern template themselves are adopted. Therefore, because there is no fluctuation of the dummy pattern template, it becomes possible to improve the accuracy of the timing verification.

The aforementioned embodiments are summarized as follows: A dummy metal insertion processing method includes: before carrying out a timing verification processing of a semiconductor circuit, preliminarily superposing and arranging a dummy pattern template stored in a dummy pattern template storage device storing a dummy pattern template representing an arrangement pattern of dummy metal, onto a layout area defined by a layout data stored in a layout data storage device storing layout data of the semiconductor circuit while changing an origin position of the dummy pattern template, to optimize and store into an arrangement data storage device, the origin position of the dummy pattern template; and upon detecting that it is confirmed that a result of the timing verification processing has no problem, superposing and arranging the dummy pattern template onto the layout area defined by the layout data stored in the layout data storage, at the optimized origin position of the dummy pattern template, which is stored in the arrangement data storage device, to generate and store into an updated layout data storage device, the layout data after inserting the dummy metal.

Thus, it is possible to appropriately insert the dummy metal, although only a small amount of data including the dummy pattern template and its origin position increases.

In addition, the preliminarily superposing and arranging may include calculating variations of a wiring capacity and wiring resistance for each wiring in a case where the origin position of the dummy pattern template was optimized, and storing the variations into a variation storage device for the timing verification processing. When data stored in the variation data storage device is used for the timing verification, it is possible to improve the accuracy of the timing verification because the arrangement of the dummy pattern template is taken into account.

In addition, in the aforementioned preliminary superposing and arranging, the origin position of the dummy pattern template may be optimized by minimizing a cost, which is a total increase of wiring capacities. Namely, this is carried out in order to carry out the dummy metal insertion, which enables the influence to the timing verification to be small. Incidentally, the metal density may be a restriction condition.

Furthermore, the calculating variations may include, for each sub-area in a layout area defined by the layout data, calculating a variation of the wiring capacity for each wiring segment, from a length of a wiring segment in the sub-area, a distance between the wiring segment and the nearest dummy metal piece and data representing a relation among the length, the distance and the variation of the wiring capacity, and storing the variation of the wiring capacity into a variation data storage device. Thus, it becomes possible to calculate the variation of the wiring capacity at high speed.

Furthermore, the aforementioned calculating the variation may include, for each sub-area in a layout area defined by the layout data, identifying a variation of the wiring resistance for each wiring segment, from the metal density of the sub-area and data representing a relation between the metal density and the variation of the wiring resistance, and storing the identified variation into the variation data storage device. Thus, it becomes possible to identify the variation of the wiring resistance at high speed.

Furthermore, the aforementioned calculating the variation may include, for each sub-area in a layout area defined by the layout data, calculating the variation of the wiring capacity for each wiring segment from a length of the wiring segment in the sub-area, a first distance between the wiring segment and the nearest dummy metal piece in the same layer, a second distance between the wiring segment and the nearest dummy metal piece in a different layer and data representing a relation among the length, the first and second distances and the variation of the wiring capacity, and storing the calculated variation into the variation data storage device. Thus, it becomes possible to improve the accuracy of the variation of the wiring capacity and calculate the variation of the wiring capacity at high speed.

In addition, the aforementioned dummy pattern template storage device may store a plurality of dummy pattern templates. In such a case, in the preliminarily superposing and arranging, the dummy pattern templates are preliminarily superposed and arranged while changing the dummy pattern template and changing the origin position of the dummy pattern template to identify the optimum dummy pattern template and the optimum origin position of the optimum dummy pattern template. Thus, it becomes possible to identify much preferable dummy pattern template and its origin position.

Furthermore, the layout area defined by the layout data may be divided into a plurality of areas. In such a case, the preliminary superposing and arranging may be carried out for each divided area. Thus, it is possible to identify the more preferable combination of the dummy pattern templates.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

Figure 32:
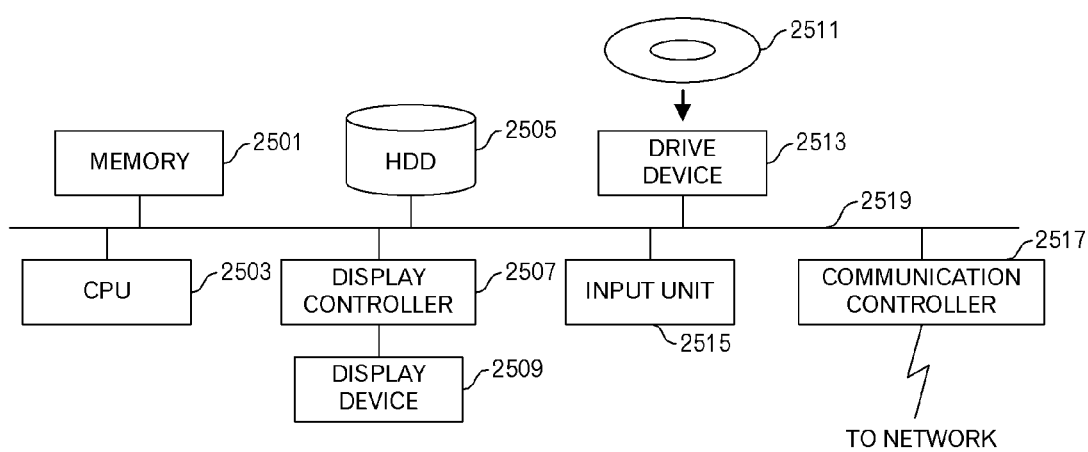
FIG. 32 is a functional block diagram of a computer.
Figure 33:
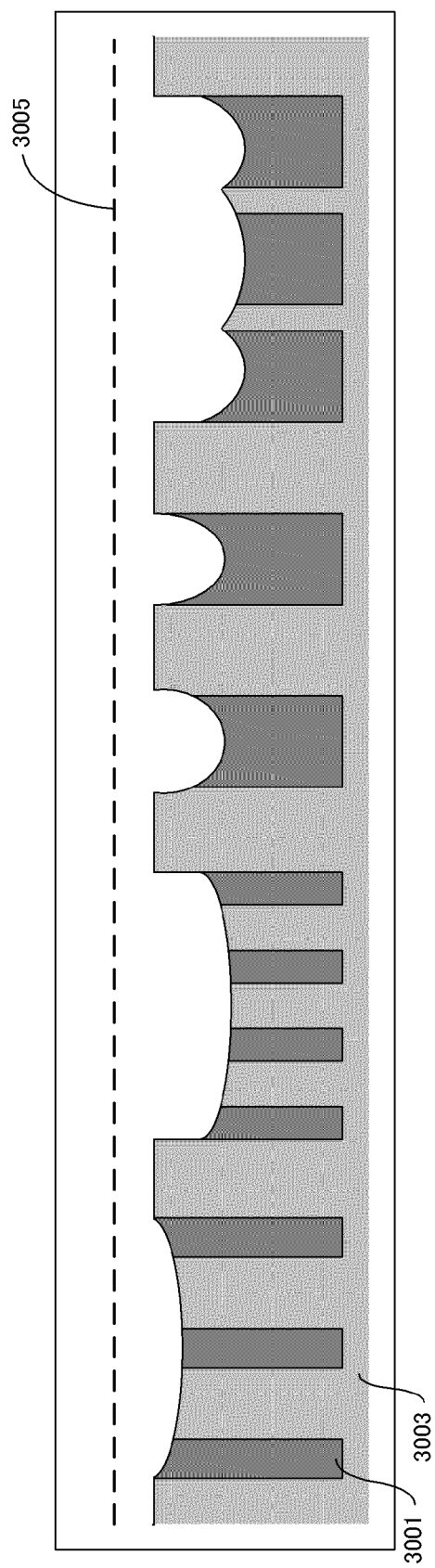
FIG. 33 is a diagram to explain the necessity to insert the dummy metal.

Incidentally, the aforementioned semiconductor design apparatus is a computer device as shown in FIG. 32. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 32. An operating system (OS) and an application program for carrying out the foregoing processing in the embodiment are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technology, the application program to realize the aforementioned functions is stored in the computer-readable removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a dummy metal insertion processing program for causing a computer to execute a procedure, said procedure comprising:

optimizing an origin position of a dummy pattern template representing an arrangement pattern of dummy metal by preliminarily superposing and arranging said dummy pattern template, onto a layout area defined by layout data of a semiconductor circuit, while changing said origin position of said dummy pattern template; and upon detecting that it is confirmed that a result of a timing verification processing has no problem, superposing and arranging said dummy pattern template onto said layout area defined by said layout data at the optimized origin position of said dummy pattern template, to generate second layout data after inserting said dummy metal, wherein said preliminarily superposing and arranging comprises calculating variations of a wiring capacity and a wiring resistance, for each wiring, in a case where said origin position of said dummy pattern template was optimized, wherein said calculating said variations comprises, for each sub-area in said layout area defined by said layout data, calculating a variation of said wiring capacity for each wiring segment, from a length of said wiring segment in said sub-area, a distance between said wiring segment and a nearest dummy metal piece and data representing a relation among said length, said distance and said variation of said wiring capacity.

2. The computer-readable, non-transitory storage medium as set forth in claim 1, wherein said preliminary superposing and arranging comprises detecting an origin position of said dummy pattern template, which makes a cost that is a total increase of wiring capacities minimized.

3. The computer-readable, non-transitory storage medium as set forth in claim 1, wherein said calculating said variation comprises, for each sub-area in said layout area defined by said layout data, identifying a variation of said wiring resistance for each wiring segment, from a metal density of said sub-area and data representing a relation between said metal density and said variation of said wiring resistance.

4. A computer-readable, non-transitory storage medium storing a dummy metal insertion processing program for causing a computer to execute a procedure, said procedure comprising:

optimizing an origin position of a dummy pattern template representing an arrangement pattern of dummy metal by preliminarily superposing and arranging said dummy pattern template, onto a layout area defined by layout data of a semiconductor circuit, while changing said origin position of said dummy pattern template; and upon detecting that it is confirmed that a result of a timing verification processing has no problem, superposing and arranging said dummy pattern template onto said layout area defined by said layout data at the optimized origin position of said dummy pattern template, to generate second layout data after inserting said dummy metal, wherein said preliminarily superposing and arranging comprises calculating variations of a wiring capacity and a wiring resistance, for each wiring, in a case where said origin position of said dummy pattern template was optimized, wherein said calculating said variation comprises, for each sub-area in said layout area defined by said layout data, calculating said variation of said wiring capacity for each wiring segment, from a length of said wiring segment in said sub-area, a first distance between said wiring segment and a nearest dummy metal piece in a same layer, a second distance between said wiring segment and a nearest dummy metal piece in a different layer and data representing a relation among said length, said first and second distances and said variation of said wiring capacity.

5. The computer-readable, non-transitory storage medium as set forth in claim 1, wherein a dummy pattern template storage device stores a plurality of dummy pattern templates, and said preliminarily superposing and arranging is executed while changing said dummy pattern template among said plurality of dummy pattern templates.

6. The computer-readable, non-transitory storage medium as set forth in claim 1, wherein said layout area defined by said layout data is divided into a plurality of second areas, and said preliminarily superposing and arranging is executed for each of said plurality of second areas.

7. A dummy metal insertion processing method, comprising:

optimizing, by using a computer, an origin position of a dummy pattern template representing an arrangement pattern of dummy metal by preliminarily superposing and arranging said dummy pattern template onto a layout area defined by layout data of a semiconductor circuit, while changing said origin position of said dummy pattern template; and upon detecting that it is confirmed that a result of a timing verification processing has no problem, superposing and arranging, by using said computer, said dummy pattern template onto said layout area defined by said layout data at the optimized origin position of said dummy pattern template, to generate second layout data after inserting said dummy metal, wherein said preliminarily superposing and arranging comprises calculating variations of a wiring capacity and a wiring resistance, for each wiring, in a case where said origin position of said dummy pattern template was optimized, wherein said calculating said variations comprises, for each sub-area in said layout area defined by said layout data, calculating a variation of said wiring capacity for each wiring segment, from a length of said wiring segment in said sub-area, a distance between said wiring segment and a nearest dummy metal piece and data representing a relation among said length, said distance and said variation of said wiring capacity.

8. A dummy metal insertion processing apparatus, comprising:

a layout data storage device storing layout data of a semiconductor circuit;

a first unit that optimizes an origin position of a dummy pattern template representing an arrangement pattern of dummy metal by preliminarily superposing and arranging said dummy pattern template onto a layout area defined by said layout data stored in said layout data storage device, while changing said origin position of said dummy pattern template; and a second unit that superposes and arranges, upon detecting that it is confirmed that a result of a timing verification processing has no problem, said dummy pattern template onto said layout area defined by said layout data at the optimized origin position of said dummy pattern template, to generate second layout data after inserting said dummy metal, wherein said preliminary superposing and arranging comprises calculating variations of a wiring capacity and a wiring resistance, for each wiring, in a case where said origin position of said dummy pattern template was optimized, wherein said calculating said variations comprises, for each sub-area in said layout area defined by said layout data, calculating a variation of said wiring capacity for each wiring segment, from a length of said wiring segment in said sub-area, a distance between said wiring segment and a nearest dummy metal piece and data representing a relation among said length, said distance and said variation of said wiring capacity.

9. A dummy metal insertion processing method, comprising:

optimizing, by using a computer, an origin position of a dummy pattern template representing an arrangement pattern of dummy metal by preliminarily superposing and arranging said dummy pattern template onto a layout area defined by layout data of a semiconductor circuit, while changing said origin position of said dummy pattern template; and upon detecting that it is confirmed that a result of a timing verification processing has no problem, superposing and arranging, by using said computer, said dummy pattern template onto said layout area defined by said layout data at the optimized origin position of said dummy pattern template, to generate second layout data after inserting said dummy metal, wherein said preliminarily superposing and arranging comprises calculating variations of a wiring capacity and a wiring resistance, for each wiring, in a case where said origin position of said dummy pattern template was optimized, wherein said calculating said variation comprises, for each sub-area in said layout area defined by said layout data, calculating said variation of said wiring capacity for each wiring segment, from a length of said wiring segment in said sub-area, a first distance between said wiring segment and a nearest dummy metal piece in a same layer, a second distance between said wiring segment and a nearest dummy metal piece in a different layer and data representing a relation among said length, said first and second distances and said variation of said wiring capacity.

10. A dummy metal insertion processing apparatus, comprising:

a layout data storage device storing layout data of a semiconductor circuit;

a first unit that optimizes an origin position of a dummy pattern template representing an arrangement pattern of dummy metal by preliminarily superposing and arranging said dummy pattern template onto a layout area defined by said layout data stored in said layout data storage device, while changing said origin position of said dummy pattern template; and a second unit that superposes and arranges, upon detecting that it is confirmed that a result of a timing verification processing has no problem, said dummy pattern template onto said layout area defined by said layout data at the optimized origin position of said dummy pattern template, to generate second layout data after inserting said dummy metal, wherein said preliminarily superposing and arranging comprises calculating variations of a wiring capacity and a wiring resistance, for each wiring, in a case where said origin position of said dummy pattern template was optimized, wherein said calculating said variation comprises, for each sub-area in said layout area defined by said layout data, calculating said variation of said wiring capacity for each wiring segment, from a length of said wiring segment in said sub-area, a first distance between said wiring segment and a nearest dummy metal piece in a same layer, a second distance between said wiring segment and a nearest dummy metal piece in a different layer and data representing a relation among said length, said first and second distances and said variation of said wiring capacity.

* * * * *